Aug. 9, 1960    D. L. WATSON ET AL    2,948,624
EXPANSIBLE METAL FOIL PACKAGE
Filed Dec. 16, 1954    2 Sheets-Sheet 1

INVENTOR
Dighton L. Watson
Forest K. Michaelson
BY Robert M. Dunning
ATTORNEY

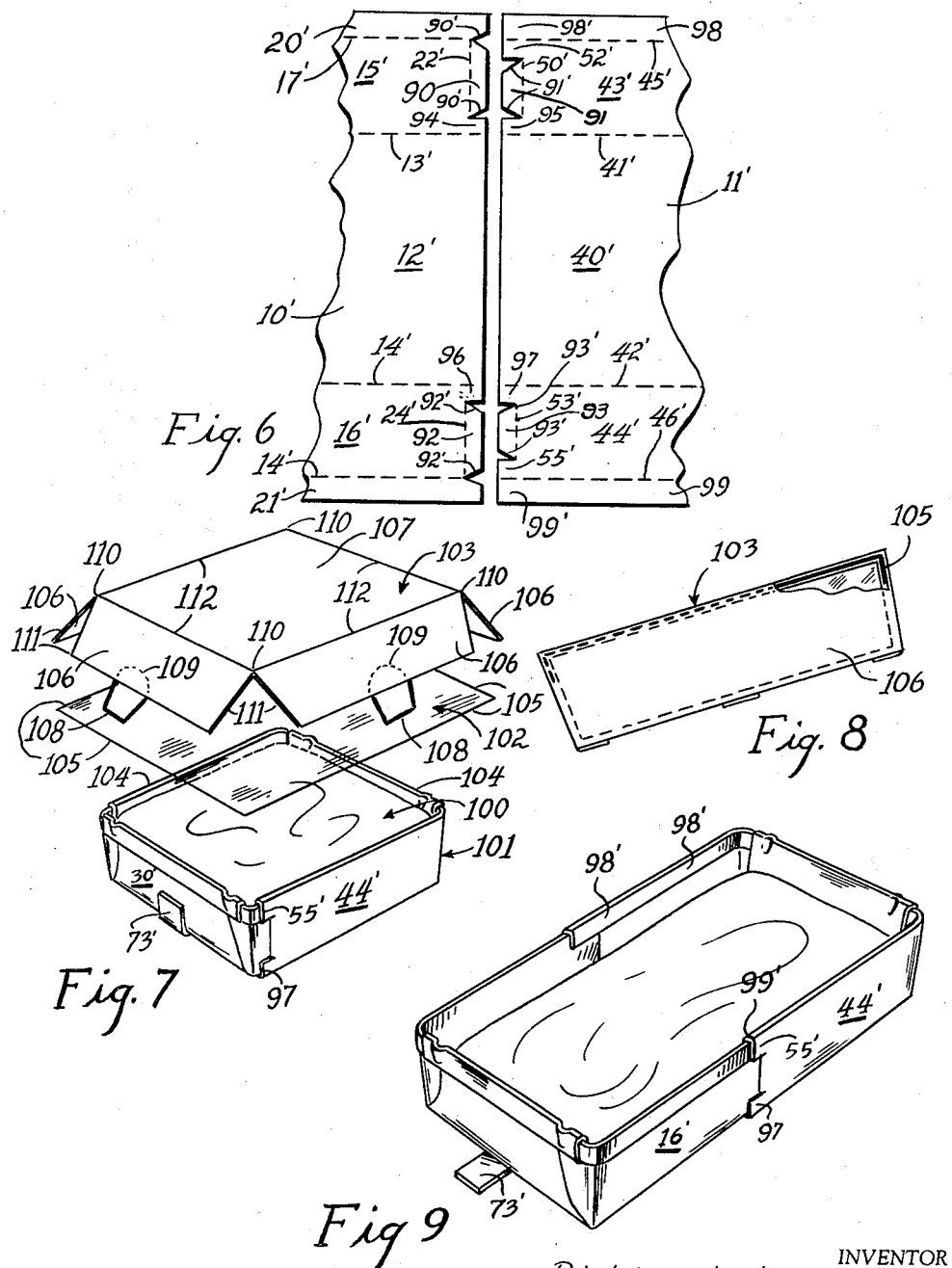

United States Patent Office 2,948,624
Patented Aug. 9, 1960

2,948,624

EXPANSIBLE METAL FOIL PACKAGE

Dighton L. Watson, 4033 13th Ave. S., and Forest K. Michaelson, 4008 46th Ave. S., both of Minneapolis, Minn.

Filed Dec. 16, 1954, Ser. No. 475,764

6 Claims. (Cl. 99—171)

This invention relates to an improvement in disposable merchandizable refrigerated food cartons for uncooked bakery goods in which the goods are to be baked having a defined shape and contour and the method of using the same. More particularly, the improvement provides for a throw-away expansible metal foil baking carton for refrigerated and frozen bakery doughs and batters wherein the doughs and batters are refrigerated and frozen in a collapsed inexpensive salable and disposable carton which is self-sealing and when expanded provides relatively inseparable reinforced foil carton structure having increased room for flattening out, shaping, and baking, or raising and baking the dough in the carton in which it was sold, and after baking, the carton can be torn by the fingers or cut to effect a removal of the baked contents.

In preparing a frozen bakery dough for sale with baking subsequent to the sale, the problem has been not alone in packaging but also in providing a suitable inexpensive carton which would be serviceable for the baking process. Concerned with the packaging problem is also involved a matter of most economically utilizing the full size of the package in relationship to the weight and quantity of the article placed on sale therein.

Accordingly, it is an object of this invention to provide an improved dispensable expansible metal foil baking carton for merchandizing frozen doughs and batters.

It is another object of this invention to provide a throw-away expansible metal foil baking package for doughs and batters.

Another object is to provide an improved salable expansible metal foil carton packaging contained refrigerated doughs and batters for home baking and the method by which the dough or batter is packaged, refrigerated, thawed out, raised and baked all in the same carton.

Another object is to provide an improved expansible metal foil carton for frozen doughs and batters which forms a self-seal at the base and edge contact faces of the non-expanded package and also is self-sealing at the improved reinforcement of the frame edges of the carton sections in the expanded condition.

Further objects and advantages will be apparent from the following description of the accompanying drawings, wherein:

Figure 6 is a modification of Figure 5 shown only as a partial view illustrating the modification of the blanks.

Figure 7 is an exploded perspective of a filled expansible modified foil baking carton and its associated cover.

Figure 8 is a perspective of a packaged carton of dough or batter with a corner section partially broken away.

Figure 9 is a perspective of an expanded modified foil baking carton with dough or batter leveled out and ready for the oven.

In the following description similar parts in a like relationship will be indicated by similar and prime numeral.

Figure 5:
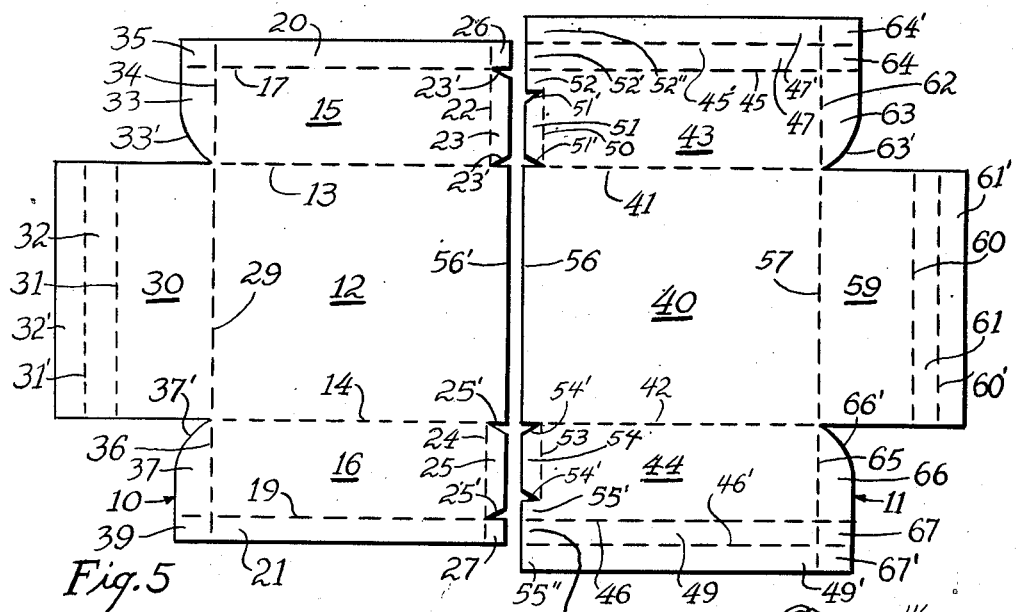
Figure 5 is a diagrammatic view of the blanks from which the carton is formed.

The improved expansible metal foil food carton is indicated in general by the letter "A." The carton is formed as is best illustarted in Figure 5 of the drawings and comprises two identically sized metal foil blanks, formed from thin aluminum foil sheeting of a thickness of .0059 inch but which, within critical limits for expansible foil carton structures may vary from about .003 inch to not over .0059 inch, and each section of which is folded in a different manner, as hereinafter described. The carton A is formed of these two blanks forming the carton sections 10 and 11 which, when folded, telescope together. The blank 10 includes a bottom panel 12 foldably connected along fold lines 13 and 14 to side walls 15 and 16, respectively. The side walls 15 and 16 are connected along their upper edges by other upper fold lines 17 and 19 to flanges 20 and 21, respectively. One end of each side wall is connected along a fold line 22 to an end flange 23, the side wall 15 connected along the fold line 22 to the flange 23 and the side wall 16 being foldably connected along the fold line 24 to the end flange 25. The fold lines 22 and 24 are aligned. The triangular shaped cut out sections 23' and 25', and 51' and 54' are provided to reduce bulk and allow slippage of interfitting parts, as hereinafter described. The flange 20 is connected to an end flange 26. This flange 26 is disconnected from the flange 23 by the angular cut out portion 23'.

In a similar manner the flange 21 is connected to an end flange 27. This flange 27 is disconnected from the flange 25 by the angular cut out section or portion 25'. The flanges 20 and 21 are folded outwardly and downwardly with end flanges 26 and 27 against the outside folded back with end flanges 23 and 25 to provide edge reinforcement, as hereinafter described.

The bottom panel 12 is connected along a fold line 29 to an end wall panel 30. This panel 30 is connected along its upper edge by a fold line 31 to a flange 32. A flange 33 having a rounded out edge 33' is connected to an end edge of the side wall 15 along the fold line 34 which is an extension of the fold line 29 inside panel 15. A corresponding end edge of the flange 20 is connected along an extension of the fold line 34 to a flange 35. This flange is also connected to the side edge flange 33 along an extension of the fold line 17.

The opposite end edge of the side wall panel 16 is connected along a fold line 36 to a flange 37 having a rounded out edge 37'. The corresponding end edge of the flange 21 is also connected along an extension of the fold line 36 to a flange 39. An extension of the fold line 19 connects the flanges 37 and 39 which are folded outwardly and downwardly with flanges 20 and 21 and then inwardly with flanges 33 and 37 to be overlapped by and crimped with flange 32 of end wall 30 in forming the carton section 10, as hereinafter described.

The blank 11 is somewhat differently formed and as the flanges are differently folded the parts will be differently numbered for simplicity of identification. The blank 11 includes a bottom panel 40 connected along parallel fold lines 41 and 42 to side wall panels 43 and 44, respectively. The upper edges of the side wall panels 43 and 44 are connected along fold lines 45 and 46 to inwardly and downwardly folding spaced flanges 47 and 49, and fold lines 45' and 46' to infolding and underfolding flanges 47' and 49', respectively. The side wall panel 43 is connected along a fold line 50 to a flange 51 and the corresponding end of the flange 47 is connected along an extension of the fold line 45 to a flange 52, and holding flanges 52' and 52" as an extension of panel 43. The side wall 44 is connected along a fold line 53 to a flange 54 and the corresponding end of the flange 49 extends along the fold line 46 to a flange 55, and holding flanges 55' and 55" as an extension of panel 44. The fold lines 50 and 53 are aligned in a ciritical relationship to form a ⅛" flap which provides a ⅜" overlap or offset in relationship to the free edge 56 of the bottom panel 40. The offset panel edge 56 in conjunction with the interlocking flanges, and reinforcement thereof, as herein described, are critical features within the limits of ⅛" to ¼" for each with the overlap of from ⅜" to ¾" both for supporting the carton sections in a non-folding and sealed condition in obtaining maximum expansion relative to strength and also with reference to the most efficient uniform color in baking.

The edge of the bottom panel 40 opposite the free edge 56 is connected along a fold line 57 to an end wall panel 59, which in turn is connected at its upper edge by a fold line 60 to an outwardly and downwardly folding flange 61, which in turn is connected by fold line 60' to an infolded flange 61'. One end of the side wall 43 is connected along a fold line 62 to an end wall flange 63 having rounded cut edge 63'. The corresponding edge of the flange 47 is connected along an extension of the fold line 62 to an inwardly folding flange 64. A fold line 65 connects an inwardly folding end wall flange 66 to the side wall 44 and the corresponding edge of the flange 49 is connected along an extension of the fold line 65 to an outwardly and inwardly foldable flange 67. The flanges 63, 64 and 64' as well as the flanges 66, 67 and 67' are foldably connected along extensions 62 and 65 of the fold line 57. The top edge flanges 47', 49' and 61' are extensions of the side walls 43 and 44 and end wall 59 and may be folded inwardly or outwardly of their adjacent flanges 47, 49 and 61 to fold under or over the final bend. These additional folds reinforce and strengthen the box carton both in the collapsed state and the expanded state. In some instances the extra folds 47', 49' and 61' may be dispensed with. The folded flanges 47, 47' and 49, 49' are spaced from walls 43 and 44 respectively to form a guide groove equal to the width of the edge provided by folded flanges 20 and 21 against walls 15 and 16, respectively.

In the foregoing description the blank has been shown and described as though it contained score lines or lines of fold. Actually the carton sections are formed of very thin sheet metal aluminum foil having a thickness within the critical range of about .003 inch to not over .0059 inch which can be torn by the fingers but retains its shape when folded, and formed into carton sections either collapsed or expanded, in the manner as herein described. This foil will fold accurately without the necessity of providing score lines or weakened lines at the points of fold. In other words, in describing the blanks it should be remembered that the fold lines described are merely potential fold lines and do not appear visably in the flat blank.

Figure 3:
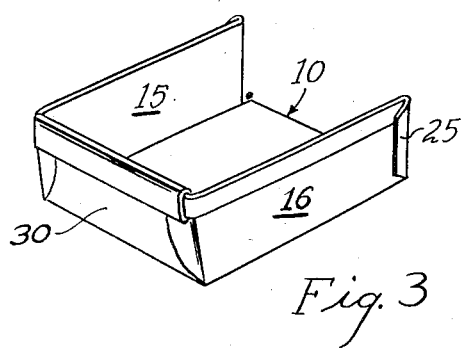
Figure 3 is a perspective view of one section of the carton shown in Figures 1 and 2.

The carton section 10 is folded into its proper folded form, as is best indicated in Figure 3 of the drawings. In forming the section 10 the side walls 15 and 16 are folded up into almost right angular relation or tipped slightly from the vertical with respect to the bottom panel 12, and the flanges 20 and 21 with the corresponding flanges 26 and 27 are folded down to overlie the outer surfaces of the panels 15 and 16. The flanges 23 and 25 attached to side walls 15 and 16, respectively, with downturned flanges 26 and 27 are folded outwardly and back in slightly spaced relationship to the wall portions 15 and 16. At the same time the flanges 35 and 39 are folded down with flanges 20 and 21 to lie outwardly of the flanges 33 and 37 to which they are secured, in the manner as hereinafter described.

The end panel 30 is folded upwardly into almost right angular relation with the bottom panel 12 and the flanges 33 and 37, together with their connected flanges 35 and 39, are folded to lie outwardly of the end panel 30. The flange 32 is next folded down to overlie the outer surface of the end wall 30, the ends of this flange overlying the folded flanges 33, 35, 37, and 39. The upper edge of the end wall is crimped at 69 and 70 where the corner flanges overlap the end wall so as to hold the section 10 in its assembled form. The walls 15, 16 and 30 are preferably slightly tipped about 2 to 5 degrees from the vertical or from being at exactly a right angular position with respect to base 12 in order to provide for nesting in shipment. However, when desired all the walls of the carton sections 10 and 11 may be on the vertical when no stacking is required.

The section 11 is folded in a different manner. The side walls 43 and 44 are folded up into almost right angular relation or tipped slightly 2 to 5 degrees from the vertical relative to the bottom panel 40. The flanges 51, 52 and 54 are folded to lie inwardly and in slightly spaced relationship to the wall panels 43 and 44, respectively. The flange 47 and its connected flanges 52 and 64 are next folded inwardly along the fold line 45 to overlie in slightly spaced relationship to the inner top edge of the wall panel 43.

In a similar manner the flanges 49 and 55 are folded inwardly and downwardly to overlie the inner surface of the panel 44 in a slightly spaced relationship to the flange 55' and the top edge of the panel 44. The connected flange 67 is folded down with flange 49 to overlie the inner surfaces of the flange 66. The space relationship of flanges 47, 52 and 49, 55 from walls 43 and 44 is of a width equal to the thickness of the flanges 20 and 21 folded against walls 15 and 16, respectively.

The end wall 59 is next erected into almost right angular relation tipped slightly 2 to 5 degrees from the vertical with respect to the bottom panel 40. The flanges 63 and 66 with overlying flanges 64 and 67, respectively, are folded to lie outwardly of the side edges of end panel 59. The flange 61 is then folded outwardly of the end panel 59 and downwardly over the inwardly bent flanges 63 and 66 and their corresponding overlying flanges 64 and 67. The flanges 63, 64 and 64', and 66 and its connected flange 67 and 67', are folded into right angular relation with the side walls 43 and 44 to which they are secured. The upper edges of the end wall 59 and its overlying corner flanges are crimped, as indicated at 71 and 72, respectively. The side walls 15, 16, 43, and 44 and end walls 30 and 59 are all preferably at the same angular position with respect to bottoms 12 and 40 to provide close fitting, nesting and shipping.

Figures 1, 2:
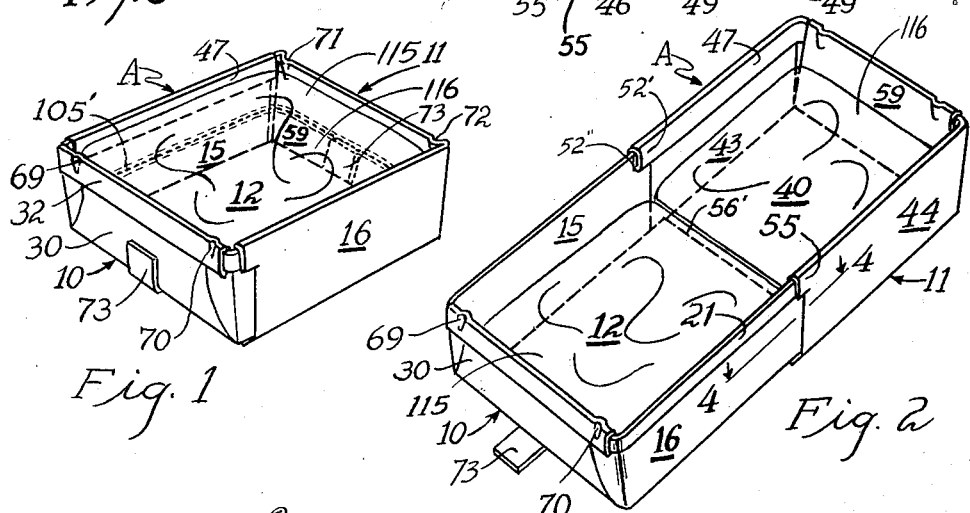
Figure 1 is a perspective view of the expansible frozen food carton in collapsed or merchandizable packaging form.
Figure 2 is a perspective view of the carton shown in Figure 1 in expanded form for a baking operation.

A pull strip such as 73 is secured to the under surface of each of the bottom panels 12 and 40 to project beyond the end walls 30 and 59 as indicated in Figure 2 or to overlie the end panels 30 and 59 in closed position of the container. These strips are anchored to the bottom panels for example, by a pressure sensitive or other adhesive firmly enough so that they may be used for expanding the carton in size.

The two sections 10 and 11 are then sandwiched together as indicated in Figure 2 of the drawings. The side walls 15 and 16, together with the connected folded flanges 20 and 21 are sandwiched between the side walls 43 and 44 of the carton section 11. The slightly spaced flanges 47 and 49 of the carton section 11 extend at 52' and 55 over the upper edges of the side walls 15 and 16 and slideably connect the two sections. The flanges 23 and 25 interlock with or engage in flanges 51 and 54 and the extended flanges, as represented at 52' and 55 with extended edge 56 provide for overlapping reinforced locking connection.

Figure 4:
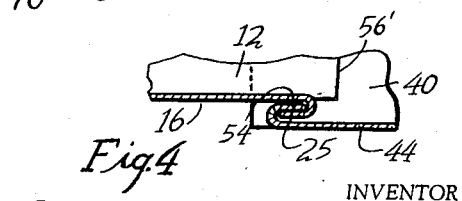
Figure 4 is a section view through a portion of the carton, the position of the section being indicated by the line 4—4 of Figure 2.

As is indicated in Figure 4 of the drawings, the inner flange 25 and a similar flange 23, of the walls 15 and 16 of the carton section 10 fold outwardly while the flange 54 and a similar flange 51 of the walls 43 and 44 fold inwardly. As a result these elements interlock in abutting relationship to limit the outward slideable movement of the two sections and hold the open ends of the carton section 10 and 11 in an abutting relationship with one or the other, or both, of the extended base or bottom edges 56 and 56′ in overlapping relationship and forming an edge seal together with the end innerlocking flanges 25 and 54, and 23 and 51. In this arrangement in the expanded position, the extended overlapping edges 56′ and 56 of base members 12 and 40, the innerlocking end flanges of the partial carton sides, as described, and the extended folded flange guides, as represented in Figure 2 by 52′ and 55 provide a strong juncture which does not become mechanically defective and is simple to operate without falling apart or requiring mechanical ability. Further, the interlocking relationship of the flanges and the overlap, when in the critical relationship for the material, as described, surprisingly prevents folding and separation when the carton is filled and expanded and held only at the ends.

The operation of the carton is simple. The two carton sections are telescoped together and are normally used for containing a dough or batter which is refrigerated or frozen immediately after being placed in the carton. Before the carton is used for cooking the product is thawed, if frozen solid, the pull strips 73 are engaged and the two sections are pulled into expanded form substantially doubling the size of the carton.

It is important to note that the two sections are of identical size. While the foil is thin, when one section is telescoped into the other, the bottom panel of the inner section 10 tends to bulge upwardly. When the dough is placed in the carton, the weight of this material flattens the bottom panel and spreads the walls apart so as to press the inner walls against the outer and to press the upper bottom panel against the lower. Thus the two sections are tightly held together and will not accidentally expand. However, the metal foil structure is such that the sections may be pulled into expanded form when the pull strips are engaged.

In the modified structure provided for in Figure 6 the contemplated size of the carton is one which will hold a relatively heavy dough or batter and the carton be of somewhat larger size as for handling bread dough or cartons in excess of about a 4″ x 4″ x 1″ in size in the collapsed state. In this instance the metal foil carton sections 10′ and 11′ are made from aluminum foil of .0035 inch thickness and are prefabricated the same as 10 and 11 of Figure 5 except that bases 12′ and 40′ differ in showing the maximum of innerlock and overlap. These bases 12′ and 40′ are provided with the overlays of ¾″ of the base portions 12′ and 40′. The innerlocking flanges 90, 91 and 92, 93 are ⅜″ and fold back along the dotted lines 22′ and 50′, and 24′ and 53′ in the same manner as heretofore described for the flanges 22 and 51, and 25 and 54. The primary difference lies in the provision of additional holding and reinforcing end flanges 94 and 95, extending from walls 15′ and 43′, along the fold lines 13′ and 41′, respectively, and holding and reinforcing end flanges 96 and 97 extending from walls 16′ and 44′ along the fold lines 14′ and 42′, respectively. Further the walls 43′ and 44′ have only a single fold over flange 98 and 99, with holding end flanges 98′ and 99′, respectively. These single fold over flanges 98, 99 and corresponding reinforcing end flanges 98′ and 99′ are provided along fold lines 45′ and 46′, respectively, and overlap wall portions 43 and 44 in spaced relationship to accommodate the wall portions 15′ and 16′ and their respective fold over flanges 20′ and 21′, in the manner as heretofore described with respect to the foregoing figures. The end flanges 52′ and 55′ are similar to the end flanges 52′ and 55′ shown and described, with respect to Figure 5, and the balance of the drawings except that the inturning flanges 91 and 93 are cut on lines 91′ and 93′ to form ⅜″ flanges from fold lines 50′ and 53′ to their outer edges, respectively. Similarly the flanges 90 and 92 are cut on lines 90′ and 92′ to form ⅜″ outturning flanges from fold lines 22′ and 24′ respectively. Otherwise, the box sections are folded and fitted together as described and illustrated in the Figures 1 through 5. The rigidity of a .0035 inch aluminum foil made up into an expanded carton, as described and illustrated, and its resistance to twist is comparable to an aluminum baking pan of the same size normally made of light plate material and used repeatedly for years. The difference being that a plate must be stamped out by machinery making a permanently sized pan which is more expensive, and considered non-disposable, whereas the baking carton, herein described can be correctly formed and sharply shaped by the fingers.

In order to illustrate the process involved in preparing, packaging, freezing, and baking a new and delicious fluffy devil's food cake the following batter is prepared to place in a carton size of approximately 7″ x 4″ x 2″ in the collapsed state and opens to a 7″ x 7¼″ x 2″ size baking carton:

I. *Fluffy devil's food cake*

10 tablespoons sugar
⅞ cup sifted cake flour
Pinch of salt
¼ cup butter (⅛ lb.)
1 egg beaten hard
½ cup sour milk (e.g. curdled with lemon juice)
½ teaspoon baking soda
1 square melted chocolate
1 teaspoon vanilla Cream sugar and shortening. Add beaten egg, salt, melted chocolate, and vanilla. Beat in the flour alternately with sour milk (with the ½ teaspoon soda added thereto). Beat until smooth. Place batter 100 in collapsed carton 101 as illustrated in Figure 7. Place a waxed paper sheet 102 over the filled carton 101 and cover with the covering 103. The wax sheet 102 covers and overlays the edges 104 of carton 101 about ¼ inch, so that when the cover 103 is pressed down, the edges 105, as shown in Figure 8, are bent over edges 104 by the depending side flanges 106 of top 107, are pushed in against the four sides of the carton 101. As each of the sides 106 are pushed into engagement with a corresponding carton wall the metal tabs 108 are bent inwardly and upwardly against the bottom of the carton. These metal tabs 108 are secured to the side flanges by a suitable adhesive or otherwise provided with a fastening end plate or wire 109 embedded within the laminations or pulp forming the cover 103. In order to make a smooth closing cover and packaged product the corners 110 of cover 103 are provided by cutting the flanges 106 along edges 111 at right angles to their respective fold lines 112 and in alignment with the fold lines 112 of the adjacent flanges 106. This forms the corner having cut out angles of 90° when the box sides are vertical. When the box sides are slightly inclined from the vertical, say 2 to 5 degrees, as illustrated, in order to provide for a stacking arrangement of the cartons, the angle of cut lines 110 is about 2 to 5 degrees out of alignment with the fold lines 112 of adjacent flanges 106; thus providing corners with cut-out angles of about 94 degrees, or slightly more as required, permitting the flanges 106 to fit tightly against the sides of the stacking type expansible carton.

Having the filled carton in packaged form with a cover thereover it may be immediately wrapped with a sealing type paper of plastic covering, and as it is wrapped, placed under refrigeration of 15° F. to 20° F. or under freezing refrigeration. Otherwise the sealing wrap may be applied after the packaged material has been in the freezer. The high sugar content keeps the prepared mixture from freezing solid, so that, when removed from refrigeration the carton sections are unwrapped and pulled to expand the carton to baking size. The mixture leveled out in the bottom of the expanded carton, placed in an oven at 350° F. for approximately 30 to 40 minutes, or until done as verified by a cake tester.

Illustrative of another cake mixture which can be packaged, refrigerated, the foil baking carton expanded and the mixture baked is a pound cake of the following composition:

II. Pound cake 1 lb. cake flour
1 lb. butter
1 lb. sugar
1 lb. eggs (8 to 10 eggs)
½ teaspoon almond
1½ tablespoons vanilla extract With all ingredients the same temperature, cream butter first, add sugar gradually and beat until light. Add eggs one by one and beat after each addition. Add all flavorings and mix well. Add flour gradually and blend until smooth. Pour mixture into buttered unexpanded foil carton until filled with required weight, as illustrated in Figure 7. Then wrap in the manner as indicated. Refrigerate immediately at 15° F. to 20° F. When the cartons are removed from refrigeration and unwrapped the cake batter is plastic, due to the sugar content, the foil carton expanded, in the manner as described and the batter leveled out in the expanded foil carton. The expanded foil carton being about half filled with the leveled out batter allowed to stand for about 5 to 10 minutes to thaw out and rise, or may be placed immediately in an oven and baked at 300° F. for about 1 hour and 10 to 20 minutes, or until done as verified by a cake tester.

Illustratively shown in Figure 1, is a conventional bread dough, coffee cake or other yeast raised or leavening agent dough or batter in the unraised condition but processed and prepared by the usual bakery process and immediately after mixing or kneading down are placed in the carton A as two separate pieces. A first portion or bottom piece 116 about fills the carton to the half way mark, then a waxed paper sheet 105' is placed over the first layer and a second portion or piece 115 is laid over the waxed paper to fill the carton. In general practice the dough or batter pieces 115 and 116 are prefabricated, cut and passed into a freezing unit. After freezing the cut pieces, being cut slightly shorter than the carton sections, to rest side by side when the carton is expanded, are placed in the carton, covered and wrapped and held under refrigeration until ready for use and baking. The carton is then closed as illustrated in Figures 7 and 8 and passed through a wrapping machine to seal a wrapper about the carton. From the wrapping machine the packaged dough is passed immediately into a deep freeze and frozen to the solid state in which it is merchandized.

When the packaged dough is to be baked the carton is unwrapped and expanded as illustratively shown in Figure 2. The separate frozen dough section 115 is transposed to the base of the expanded carton section and a waxed paper 105' is removed. In the particular carton A, when used for packaging a heavy dough, the carton sections are of a size to hold baked bread loaves, for example 5" x 8" x 2½" in the collapsed state and 5" x 15¼" x 2½" in an expanded state. This carton is formed of a metal foil, for example, aluminum foil of .0035 inch thickness and the additional holding flanges 95 and 97, as heretofore described with maximum flange innerlock of ⅜" and base overlap of ¾".

The bread dough is allowed to stand until thawed out and risen to about the top edge of the expanded carton then the carton and dough are placed in an oven and the dough baked until the bread is done.

Another illustrated example of a type of dough which can be packaged in our expansible baking carton, without the preliminary step of expansion, is that disclosed in Armstrong et al. Patent No. 2,478,618 and maintained under refrigeration without freezing. Further, doughs and batters containing leavening agents inactivated until placed under baking conditions are also adaptable to be packaged in our expansible baking carton, in the manner as described, without the necessity of refrigeration.

Ordinarily after a cake batter or other dough is baked in the expanded foil carton, as herein described, the cake will fall from the carton as it would from a conventional type pan in which it is normally baked. However, inasmuch as the carton is dispensable and easily cut the cake pieces can be cut with the container portion attached to support the cut out slice and aid in retention of cake moisture. Otherwise the baking carton may be washed and reused in the home, thus providing an inexpensive baking tin requiring little shelf space and which cannot be easily pulled apart in normal handling.

An advantage in the baking of a dough or batter product in our expansible foil pan lies in its being a cake or baked product saver. In this respect as slices of the baked goods are cut the carton sides are pushed together to protect the cut side or sides of the product.

In accordance with the patent statutes, we have described the principles of construction and operation of our merchandizable expansible Metal Foil Baking Container Including Method and Products Therein, and while we have endeavored to set forth the best embodiment thereof, we desire to have it understood that obvious changes may be made within the scope of the following claims without departing from the spirit of our invention.

We claim:

1. A closed package of material capable of expansion when subjected to heat, the package including a pair of telescoped tray sections of metal foil capable of withstanding the elevated temperatures at which the material will expand, each tray section including a bottom wall, opposite side walls, and a single end wall connecting said side walls, one of said tray sections including flanges on its side walls folded over the side walls of the other section to slidably connect said sections, a cover overlying said tray sections and cooperating with said sections to completely enclose said contents, said sections including cooperable means limiting outward telescoping movement of said sections and to prevent separation thereof, said expandable material substantially filling said sections, and being in direct contact with all of the walls of the tray, when the sections are telescoped into fully telescoped relation, the volume within said tray sections substantially increasing when said sections are drawn apart to permit expansion of said expandable material upon subjection to heat.

2. The structure of claim 1 and in which said sections are normally of identical cross sectional size whereby the expansion of the expandable material will urge the sides and bottom of the inner of the two telescoped sections against the outer of said sections.

3. A closed package of material capable of expansion when subjected to heat, the package including a pair of tray sections of metal foil capable of withstanding heat at which the expandable material will expand, each section including a bottom wall, side walls extending upwardly from opposite sides of said bottom wall, and an end wall extending upwardly from one end of said bottom wall and connecting said side walls, flange means on the upper edges of the side walls of at least one section connecting said sections in slidable telescoping relation, said sections being slidable from a fully telescoped condition to an expanded position in which said side and bottom walls overlap to a relatively slight extent, cover means overlying said sections and holding said sections in fully telescoped position, cooperable means on said sections engageable in expanded position of said sections to restrain said sections from separation, said expandable material substantially filling said sections, and being in direct contact with all of the walls of the tray, in fully telescoped position of said sections, whereby, when said sections are moved into expanded position, said expandable material may be spread evenly in both sections and expanded by heat to substantially fill said expanded sections.

4. The structure of claim 3 and in which said sections are normally of identical cross sectional size, whereby the expansion of the expandable material will urge the sides and bottom of the inner of the two telescoped sections against the outer of said sections.

5. The structure of claim 3 and in which said restraining means comprises interlocking means.

6. The structure of claim 3 and in which the side and end walls of said tray sections are outwardly inclined.

References Cited in the file of this patent

UNITED STATES PATENTS

| | | |
|---|---|---|
| 709,150 | Hall | Sept. 16, 1902 |
| 872,837 | Mio | Dec. 3, 1907 |
| 876,235 | Quackenboss | Jan. 7, 1908 |
| 1,858,179 | Bay | May 10, 1932 |
| 1,957,639 | Goodwin | May 8, 1934 |
| 2,426,911 | Williamson | Sept. 2, 1947 |
| 2,556,568 | Aikman | June 12, 1951 |
| 2,627,801 | Danziger | Feb. 10, 1953 |
| 2,649,379 | Woods | Aug. 18, 1953 |
| 2,673,003 | Stewart | Mar. 23, 1954 |
| 2,673,806 | Colman | Mar. 30, 1954 |
| 2,726,156 | Armstrong | Dec. 6, 1955 |

FOREIGN PATENTS

| | | |
|---|---|---|
| 375,694 | Great Britain | June 30, 1932 |

OTHER REFERENCES

"Quick Frozen Foods," October 1953 (page 69).